(12) United States Patent
Punj

(10) Patent No.: US 11,115,316 B2
(45) Date of Patent: Sep. 7, 2021

(54) LEARNING ORPHAN PORTS IN A MULTI-CHASSIS LINK AGGREGATION GROUP

(71) Applicant: Arista Networks, Inc., Santa Clara, CA (US)

(72) Inventor: Arun Punj, Cupertino, CA (US)

(73) Assignee: Arista Networks, Inc., Santa Clara, CA (US)

(*) Notice: Subject to any disclaimer, the term of this patent is extended or adjusted under 35 U.S.C. 154(b) by 37 days.

(21) Appl. No.: 16/506,919

(22) Filed: Jul. 9, 2019

(65) Prior Publication Data

US 2021/0014155 A1 Jan. 14, 2021

(51) Int. Cl.
*H04L 12/851* (2013.01)
*H04L 12/709* (2013.01)
*H04L 12/935* (2013.01)

(52) U.S. Cl.
CPC ........ *H04L 45/245* (2013.01); *H04L 49/3027* (2013.01)

(58) Field of Classification Search
CPC .......................... H04L 45/245; H04L 49/3027
See application file for complete search history.

(56) References Cited

U.S. PATENT DOCUMENTS

| | | | | |
|---|---|---|---|---|
| 6,553,029 B1* | 4/2003 | Alexander | ............ | H04L 49/351 370/389 |
| 9,407,537 B1* | 8/2016 | Shekhar | ................ | H04L 45/245 |
| 2005/0030948 A1* | 2/2005 | Wyatt | ..................... | H04L 49/30 370/392 |
| 2016/0036728 A1* | 2/2016 | Duda | .................. | H04L 12/4641 370/357 |

* cited by examiner

*Primary Examiner* — Steven H Nguyen
(74) *Attorney, Agent, or Firm* — Fountainhead Law Group P.C.

(57) ABSTRACT

Forwarding of network data received in a switch includes identifying forwarding information from mapping tables stored in the switch. The mapping tables can be indexed using information in the received network data identify the forwarding information, including using at least an identifier of the ingress port of the switch on which the network data was received.

20 Claims, 13 Drawing Sheets

LEARNING ORPHAN PORTS IN A MULTI-CHASSIS LINK AGGREGATION GROUP

BACKGROUND

Link Aggregation Group (LAG) is a method defined by the IEEE 802.1AX-2008 standard that groups multiple Ethernet links (Layer 2) as one logical link in order to increase bandwidth and provide redundancy. Link aggregation allows one or more links to be aggregated together such that a MAC client can treat the LAG as if it were a single link. The LAG uses a single MAC address for all the device's ports in the LAG.

Multi-Chassis Link Aggregation (MLAG) extends LAG across multiple switches. MLAG logically aggregates ports across multiple switches. For example, two 10-gigabit Ethernet ports, one each from two MLAG-configured peer switches, can connect to two 10-gigabit ports on a host, switch, or network device to create a link that appears as a single 20-gigabit port. The cooperating switches can be referred to as peer switches and communicate through an interface called a peer link.

While the primary purpose of the peer link is exchanging MLAG control information between peer switches, the peer link also carries data traffic from a device that is attached to only one port on a peer switch and thus has no alternative path. Such a port can be referred to as an orphaned port because it is not a member of an MLAG. Downstream traffic can be received by any of the peer switches in the MLAG domain. Accordingly, downstream data in network traffic through an orphaned port on a switch (referred to as an "orphan" switch) that is received by a non-orphan switch in the MLAG domain always has to be passed to the orphan switch. This can result in inefficient network performance.

SUMMARY

In accordance with the present disclosure, a method in a switching device can include receiving incoming network data on an ingress port of the switching device and generating outgoing network data for transmission to a next hop. Generating the outgoing network data can include obtaining forwarding information from one or more mapping tables using information contained in the incoming network data as one or more index keys into the one or more mapping tables, wherein the forwarding information includes a source address associated with the switching device that is determined based on whether or not the ingress port is a first kind of port or a second kind of port; and combining the incoming network data with the forwarding information to generate the outgoing network data. The method can further include sending the outgoing network data to the next hop on an egress port of the switching device.

In some embodiments, the first type of port can be a multi-chassis link aggregation group (MLAG) port on the switching device and the second kind of port can be an orphan port on the switching device.

In some embodiments, for each next hop that the switching device can transmit data to, the mapping tables can include first forwarding information to forward incoming network data received on the first kind of port to that next hop and second forwarding information to forward incoming network data received on the second kind of port to that next hop.

In some embodiments, the method can further comprise learning a new next hop device. In response to learning a new next hop device, the method can include storing first forwarding information in the mapping tables to forward incoming network data received on the first kind of port to the new hop; and storing second forwarding information in the one or more mapping tables to forward incoming network data received on the second kind of port to the new hop.

In some embodiments, the switching device can operate as a first VXLAN endpoint (VTEP) device and the source address associated with the switching device is an address of the first VTEP device when the ingress port on the switching device is a member of an MLAG, wherein the switching device operates as a second VTEP device and the source address associated with the switching device is an address of the second VTEP device when the ingress port on the switching device is an orphan port. In some embodiments, the next hop can be an uplink VTEP device.

In some embodiments, the switching device can be configured in a VXLAN, and the outgoing network data is a VXLAN packet, wherein the source address associated with the switching device and the destination address associated with the next hop are, respectively, an outer source Internet Protocol (IP) address and an outer destination IP address in the VXLAN packet.

In some embodiments, the method can further comprise encapsulating the incoming network data with a media access control (MAC) address of the ingress port of the switching device as a source MAC address in the outgoing network data and a MAC address of the next hop as a destination MAC address in the outgoing network data.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
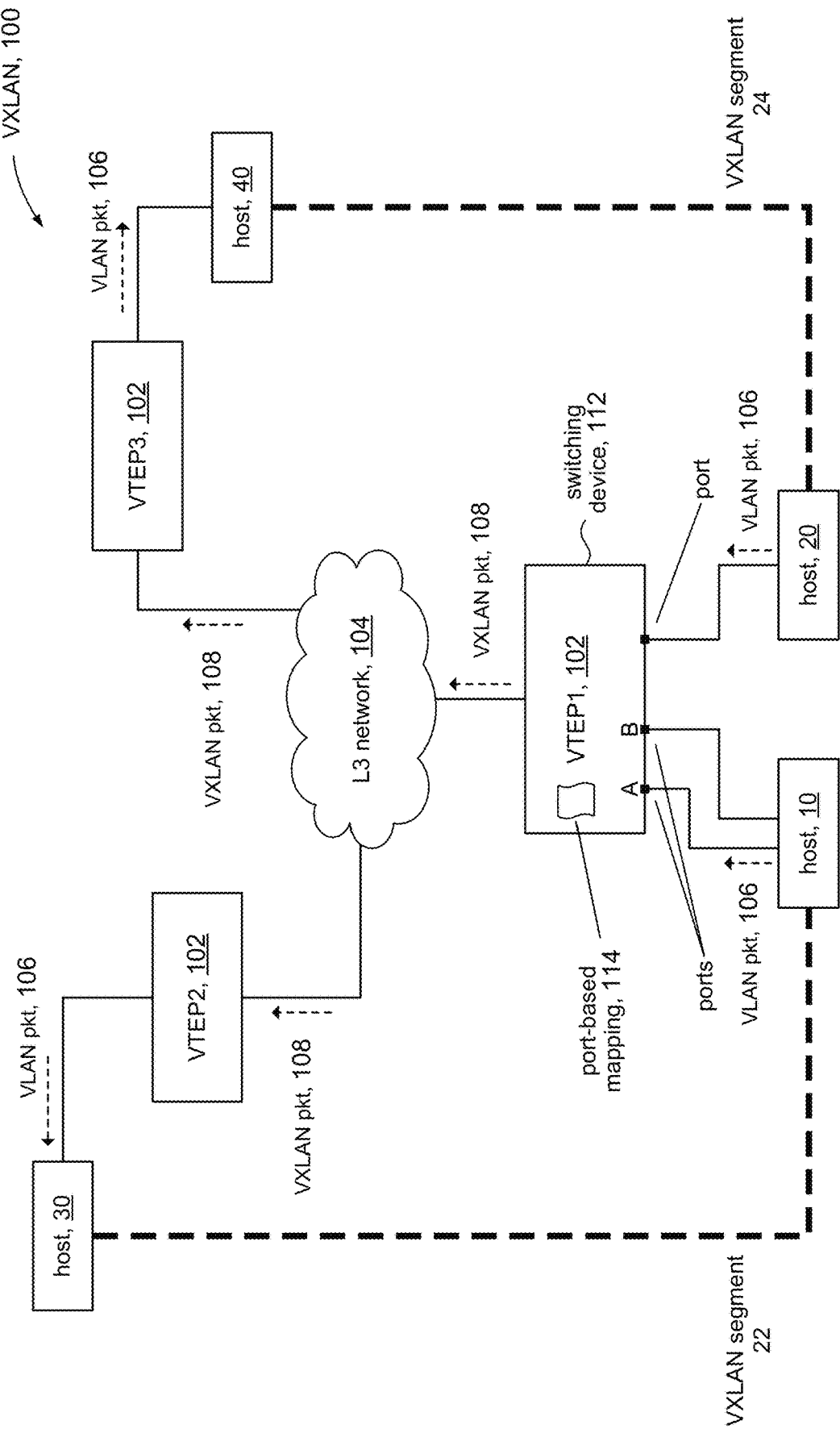
FIG. 1 illustrates a system block diagram in accordance with some embodiments.

FIG. 1 shows an example of a virtual extensible local area network (VXLAN) in accordance with the present disclosure. VXLAN and virtual local area networks (VLANs) are known standards-based network virtualization technologies. VXLAN uses Layer 3 (L3) of the Open Systems Interconnection (OSI) model to extend VLANs beyond the confines of Layer 2 (L2). VXLAN overlays a VLAN on an L3 network by providing a virtual L2 layer on the L3 network. In some embodiments of the present disclosure, and without loss of generality, a VXLAN can be based on the IEEE 802.1Q networking standard which defines VLANs on an IEEE 802.3 (L2) Ethernet network.

With reference to FIG. 1, VXLAN segments 22, 24 of VXLAN 100 logically represent VLAN segments that extend across L3 network 104 (e.g., an IP based switched network). VXLAN terminal endpoint (VTEP) devices 102 connect to L3 network 104 and serve as endpoints for different segments of VXLAN 100. In FIG. 1, for example, VTEP1 and VTEP2 can be considered the endpoints for VXLAN segment 22 (also referred to as a VXLAN domain). Likewise, VTEP1 and VTEP3 can be considered endpoints for VXLAN segment 24. The VTEPs allows hosts to communicate with other hosts in terms of VLAN segments by transporting VLAN packets over the VXLAN. For example, hosts 10, 30 can communicate with each other by sending VLAN packets, where VTEP1 and VTEP2 transparently transport the VLAN packets over corresponding VXLAN segment 22. Likewise, VTEP1 and VTEP3 transparently transport the VLAN packets over corresponding VXLAN segment 24, allowing hosts 20, 40 to communicate using VLAN packets. Hosts refer to computing devices in general and can include desktop computers, laptop computers, mobile computing devices, servers, host machines that run virtual machines, and so on.

A VTEP device (or simply VTEP) represents a physical device 112 (e.g., a switching device) that is configured to provide VTEP functionality. In some contexts, the terms VTEP, VTEP device, and switch may be used interchangeably. VTEP functionality, includes encapsulation and de-capsulation of network data (e.g., Ethernet-based VLAN packets) for transmission on the VXLAN. For example, VTEP1 can encapsulate (ingress) VLAN packets 106 received from host 10 and forward the encapsulated VLAN packets as (egress) VXLAN packets 108 to an uplink VTEP2; and vice versa, a VTEP can de-capsulate a VXLAN packet received from an uplink VTEP to recover the encapsulated VLAN packet and send the recovered VLAN packet to the destination host.

In accordance with the present disclosure, a VTEP can include port-based mapping tables to forward packets based at least on the ingress port that the VTEP received the packet on. FIG. 1, for example, shows one or more port-based mapping tables 114 in VTEP1. In accordance with the present disclosure, packets 106 received from host 10 can be forwarded according different forwarding information obtained from the port-based mapping tables 114 depending on the ingress port. Thus, for example, ingress packets received from host 10 on port A of VTEP1 may be processed differently than ingress packets received from host 10 on port B of VTEP1. This aspect of the present disclosure is discussed in more detail below.

Figure 2:
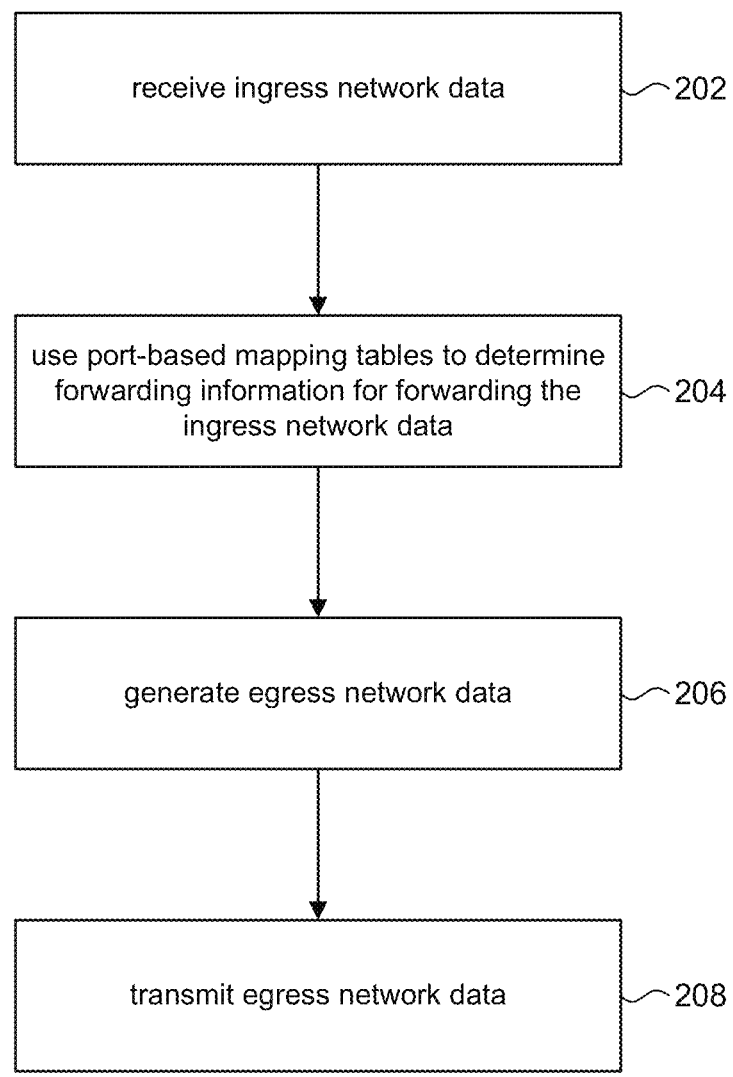
FIG. 2 is a high-level description of port-based mapping in accordance with some embodiments.

Referring to FIG. 2, the discussion will now turn to a high level description of processing ingress packets (incoming network data) in a switching device (e.g., 112) to generate VXLAN packets (outgoing network data) in accordance with the present disclosure. In some embodiments, for example, the switching device can include computer executable program code, which when executed by a computer (e.g., 1002, FIG. 10) in the switching device, can cause the computer to perform processing in accordance with FIG. 2. The flow of operations performed by the computer is not necessarily limited to the order of operations shown.

At operation 202, the switching device (e.g., 112) can receive ingress (or upstream) network data from a host computer (e.g., host 10) that is destined to a host (e.g., host 30) on a VXLAN segment. In some embodiments, for example, the ingress network data arriving at the switching device can be an Ethernet frame.

At operation 204, the switching device can determine forwarding information with which to forward the ingress network data to the destination host. In some embodiments, for example, the forwarding information can be obtained from one or more port-based mapping tables accessible by the switching device. In accordance with the present disclosure, determining the forwarding information can include using the ingress port on which the ingress network data was received to index one or more of the port-based mapping tables. This aspect of the present disclosure is discussed in more detail below.

At operation 206, the switching device can generate egress network data using the forwarding information determined at operation 204. In some embodiments, for example, the egress network data is a VXLAN packet that encapsulates the ingress network data for transport using the forwarding information obtained at operation 204.

At operation 208, the switching device can transmit the egress network data as a VXLAN packet on an egress port of the switching device.

Embodiments in accordance with the present disclosure will be explained using VXLAN networking as a specific, but nonetheless merely illustrative, network example. It will be appreciated, however, that aspects of the present disclosure can be practiced in networking contexts other than forwarding of VXLAN packets.

As explained above, VXLAN is a Layer 2 overlay scheme implemented on a Layer 3 network. VXLAN allows a Layer 2 network (overlay network) to be built over existing physical networks (underlay networks). Overlay networks use encapsulation technologies to transmit tenant packets between sites over Layer 3 forwarding paths provided by underlay networks. Although VXLAN is well understood standardized technology, a description is nonetheless given of various data fields of a VXLAN packet for the purpose of describing embodiments in accordance with the present disclosure.

Figure 3:
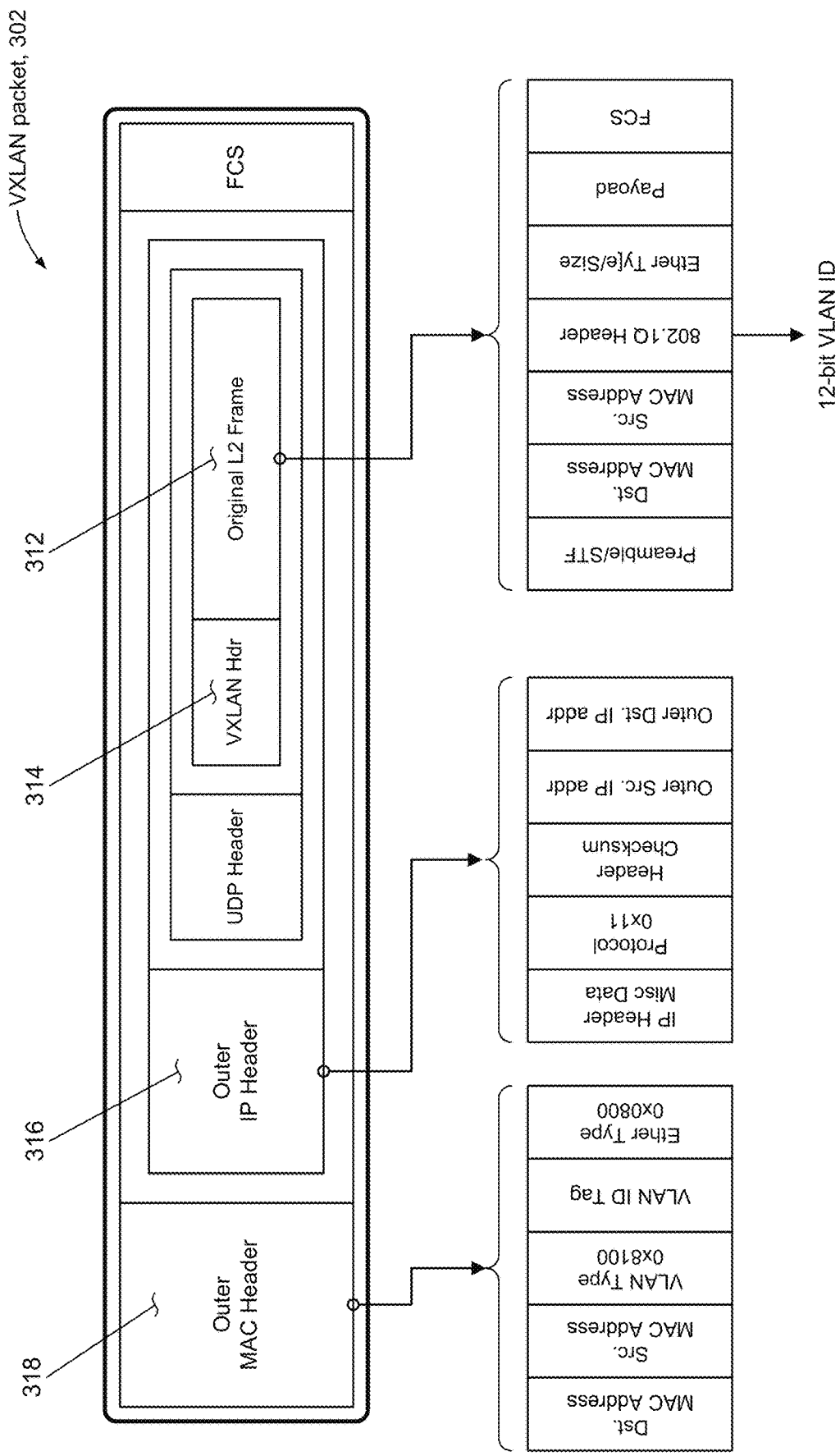
FIG. 3 shows some details of a VXLAN packet.

FIG. 3 shows data fields 312-318 in VXLAN packet 302. Data field 312 is the payload of VXLAN packet 302. In some embodiments, for example, data field 312 comprises an Original L2 Frame that represents the network data (e.g., an Ethernet packet) transmitted by the host computer (e.g., host 10, FIG. 1). The Original L2 Frame includes a VLAN ID that identifies a VLAN that the switch is connected to on which network data is being communicated. Data field 314 is a VXLAN Header that identifies a VXLAN segment (e.g., VXLAN segment 22) that forms the overlay network. Data field 316 is an Outer IP Header portion of the VXLAN packet that includes an Outer Source IP address component, which is the IP address of the source VTEP that sends the VXLAN packet, and an Outer Destination IP address component, which is the IP address of the remote VTEP that receives the VXLAN packet. Data field 318 is an Outer Ethernet Header portion of the VXLAN packet that includes a Destination MAC address component, which is the MAC address mapped to the next-hop IP address of the destination VTEP, and a Source MAC address component, which is the MAC address of the VTEP connected to the host.

Figure 4A:
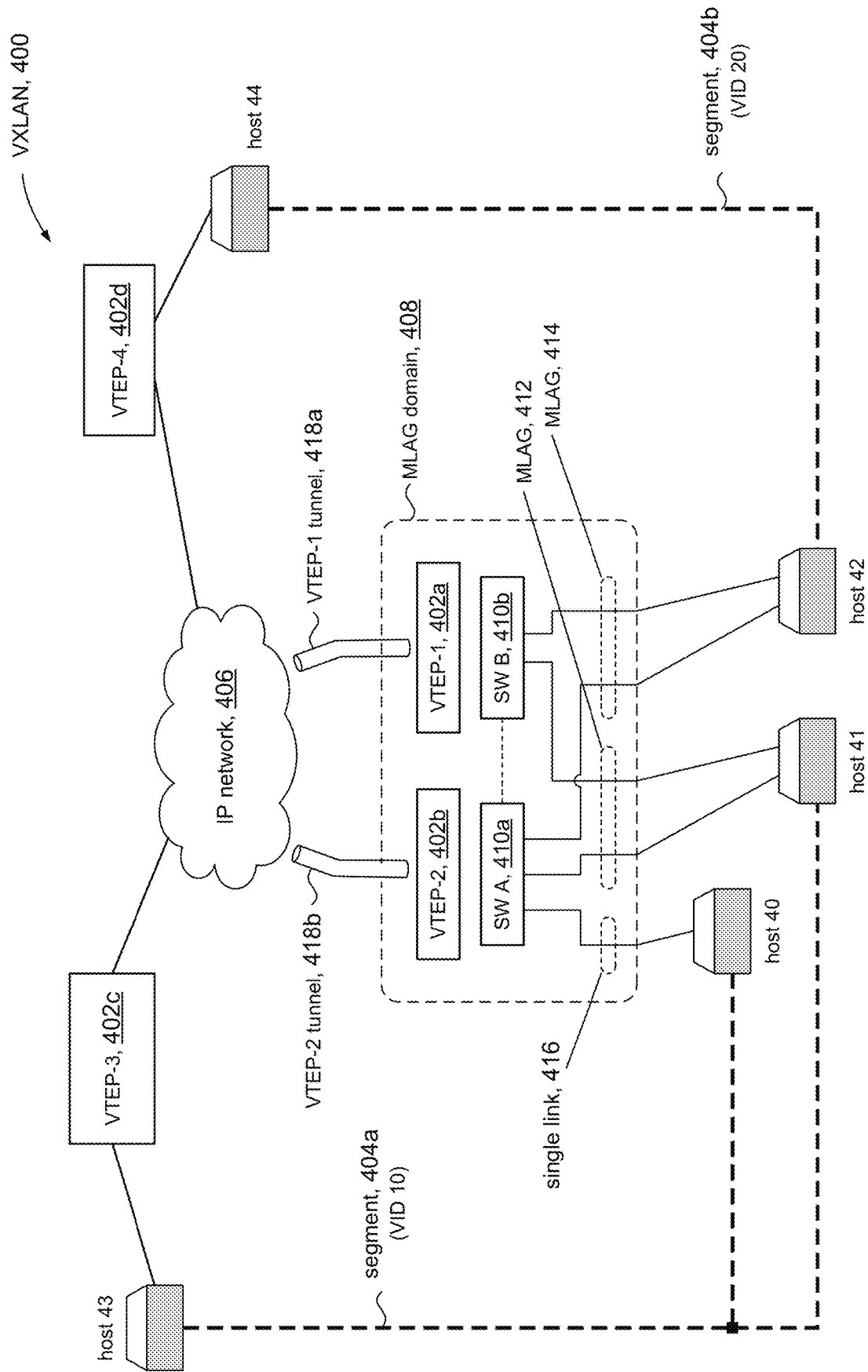
FIGS. 4A and 4B illustrate details of peer switches in an MLAG domain in accordance with some embodiments.
Figure 4B:
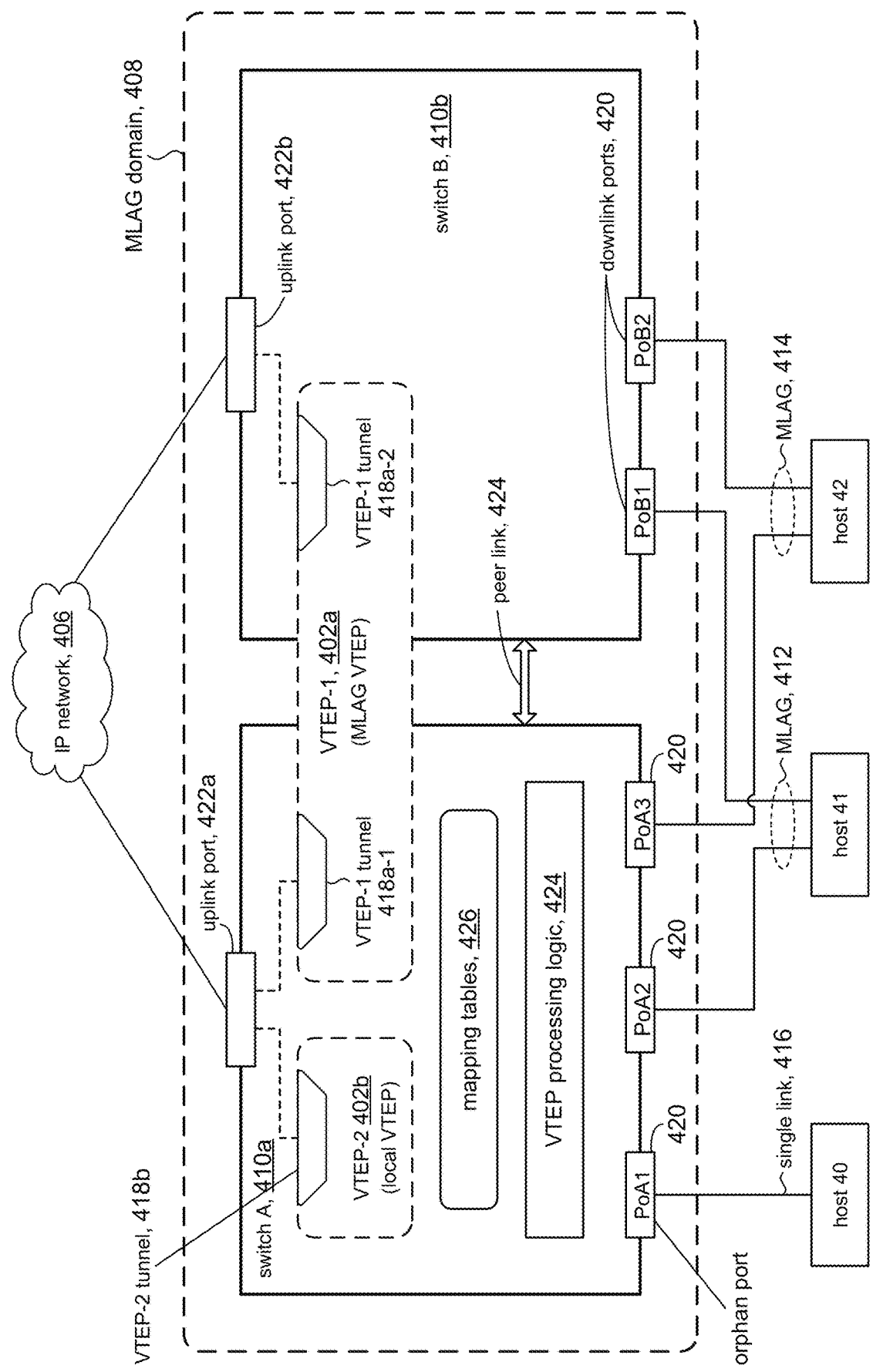

Referring to FIGS. 4A and 4B, some embodiments in accordance with the present disclosure can be directed to switches in a multi-chassis link aggregation group (MLAG) domain configured in a VXLAN. Referring to FIG. 4A, for example, VXLAN 400 comprises a set of VTEP devices 402a, 402b, 402c, 402d. As explained above, a VTEP device can comprise functionality that is embodied in a physical device, such as a switch, to perform encapsulation and de-capsulation of network data for transmission on a VXLAN. For example, a VTEP can encapsulate VLAN packets received from a host to be forwarded as VXLAN packets to an uplink VTEP. Conversely, the VTEP can de-capsulate VXLAN packets received from an uplink VTEP to recover the encapsulated frame to be sent to the destined host.

VTEPs 402a, 402b, 402c, 402d shown in FIG. 4A can support independent VXLAN segments 404a, 404b of the VXLAN. For example, VXLAN segment 404a represents one broadcast domain in VXLAN 400 that connects host 40, host 41, and host 43 (e.g., over a VLAN identified by VID 10). VXLAN segment 404b, separate from segment 404a, represents a separate broadcast domain that connects host 42 and host 44 (e.g., over VID 20). Host devices on a segment of a VXLAN are logically connected together by way of corresponding VTEPs, and thus can be isolated from host devices connected to other segments in the VXLAN.

Communication between VTEPs 402a-402d take place in Layer 3, namely IP-based communication. FIG. 4A, for example, shows VTEPs 402a-402d connected to IP network 406. In some embodiments, elements (not shown) that comprise IP network 406 can include IP routers connected to one or more local area networks (LANs), wide area networks (WANs), the public switched telephone network (PSTN), and so on.

VXLAN 400 includes MLAG domain 408. In some embodiments, for example, MLAG domain 408 can comprise two or more switches 410a, 410b. MLAGs 412, 414 respectively connect host 41 and host 42 to MLAG domain 408. Some hosts (e.g., host 40) can connect to the MLAG domain over a single wired or wireless connection (e.g., link 416). A wired connection, for example, can be an Ethernet cable connected between two devices. An example of a wireless connection can be a Wi-Fi© connection.

MLAG domain 408 can be configured with VTEP functionality. More particularly, in accordance with the present disclosure, MLAG 408 can be configured to function as two or more VTEPs. FIG. 4A, for example, shows that MLAG 408 is configured as VTEPs 402a, 402b. Each VTEP 402a, 402b is associated with a respective tunnel 418a, 418b to IP network 406.

FIG. 4B shows additional details of MLAG domain 408 in accordance with some embodiments of the present disclosure. From the point of view of external connected devices, an MLAG logically aggregates physical ports across two (or more) switches to create a logical link that appears as an ordinary link aggregation group (LAG) on a single switch. MLAG domain 408, for example, comprises two switches 410a, 410b (also referred to as "peer switches") that can cooperate to support MLAGs 412, 414. Switches 410a, 410b can coordinate with each other via peer link 424 to exchange MLAG control information and to exchange data received on one switch (e.g., 410a) that was destined for the other switch (e.g., 410b).

Physical downlink ports 420 on switches 410a, 410b can be connected as MLAGs 412, 414 to provide connectivity, respectively, to host 41 and host 42. For example, port PoA2 on switch 410a and port PoB1 on switch 410b can be referred to as members of MLAG 412. Likewise, port PoA3 on switch 410a and port PoB2 on switch 410b are members of MLAG 414. Some ports on either or both switches in an MLAG domain can be connected to hosts by single (non-MLAG) links. FIG. 4B, for example, shows that host 40 is connected by single wired or wireless link 416 to port PoA1 on switch 410a; the singly connected port PoA1 is not a member of an MLAG and thus can be referred to variously as an orphan port, a non-MLAG port, etc. Physical uplink ports 422a, 422b on respective switches 410a, 410b provide wired or wireless connectivity (links) to IP network 406.

In accordance with the present disclosure, an MLAG domain can be configured with multiple VTEPs. FIGS. 4A and 4B, for example, show MLAG domain 408 configured with two VTEPs 402a, 402b. VTEP 402a can be configured to support the MLAG domain itself and, as such, can be referred to as an MLAG VTEP. In some embodiments, for example, each switch 410a, 410b in MLAG domain 408 can be configured to collectively provide the functionality of VTEP 402a. VTEP 402a can expose tunnel 418a for connecting to IP network 406. Furthermore, referring to FIG. 4B, as an MLAG VTEP, VTEP 402a can expose a first tunnel interface 418a-1 that is associated with switch 410a for connecting the VTEP to IP network 406 via uplink port 422a and a second tunnel interface 418a-2 that is associated with switch 410b for connecting to IP network 406 via uplink port 422b.

In accordance with the present disclosure, switch 410a can be further configured to provide functionality for a second VTEP 402b (separate and different from VTEP 402a) to support switch 410a itself as a network device separate and distinct from MLAG domain 408. As such, VTEP 402b can also be referred to herein as a local VTEP (also, switch VTEP, physical VTEP, and so on) to distinguish from MLAG VTEP 402a. VTEP 402b can expose tunnel 418b which is associated only with switch 410a for connecting to IP network 406 via uplink port 122a of switch 410a.

In accordance with some embodiments of the present disclosure, switch 410a can include VTEP processing logic 424 to support the functionality of the local VTEP and the portion of the MLAG VTEP that is associated with switch 410a. Switch 410a can include port-based mapping tables 426 that are used by VTEP processing logic 424 to perform encapsulation of outgoing upstream packets in switch 410a. Although not shown, it will be understood that switch 410b can include similar VTEP processing logic to support the functionality of the portion of the MLAG VTEP associated with switch 410b.

Figure 5A:
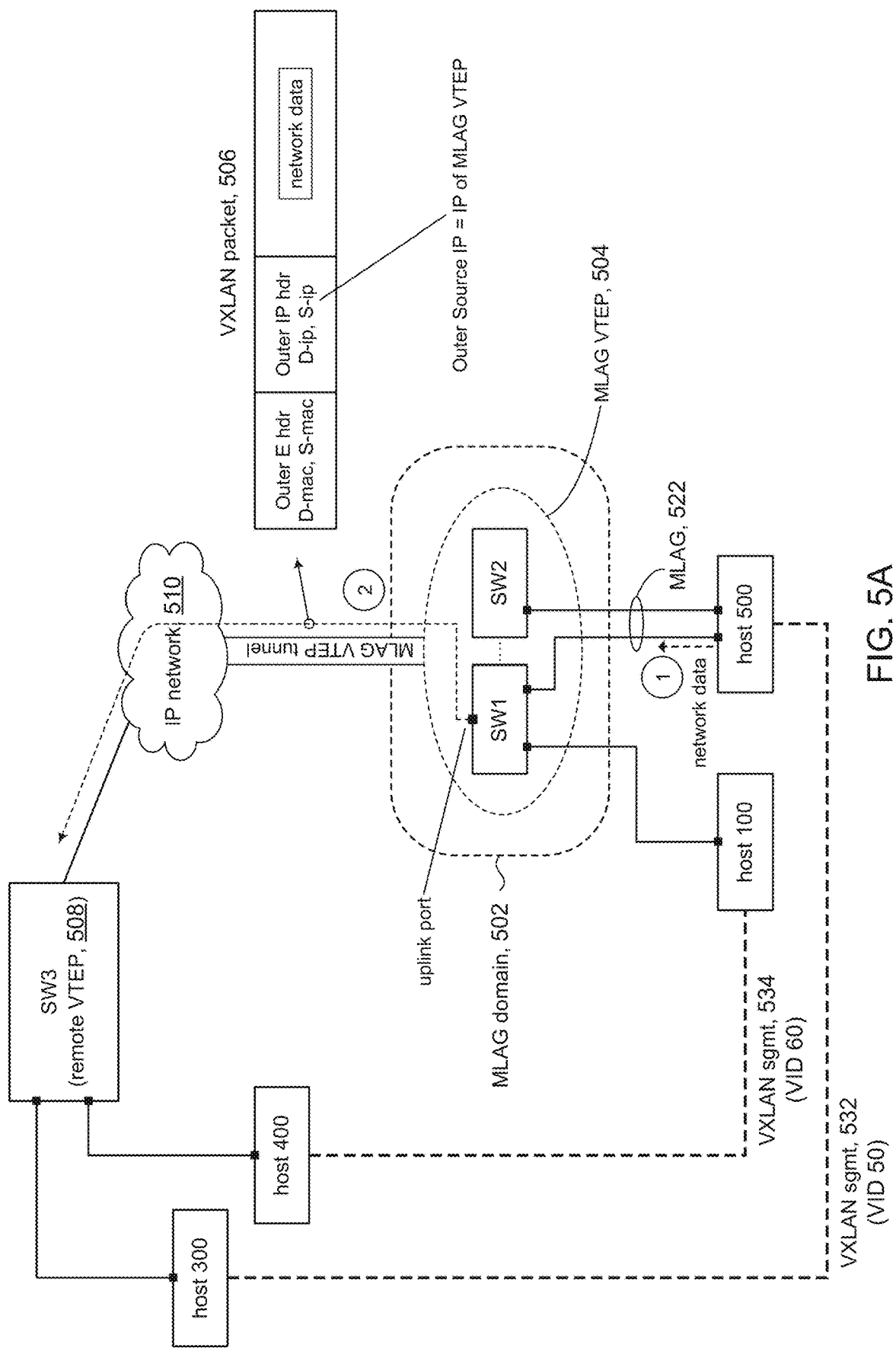
FIGS. 5A and 5B illustrate forwarding of network data (packets) in accordance with some embodiments.
Figure 5B:
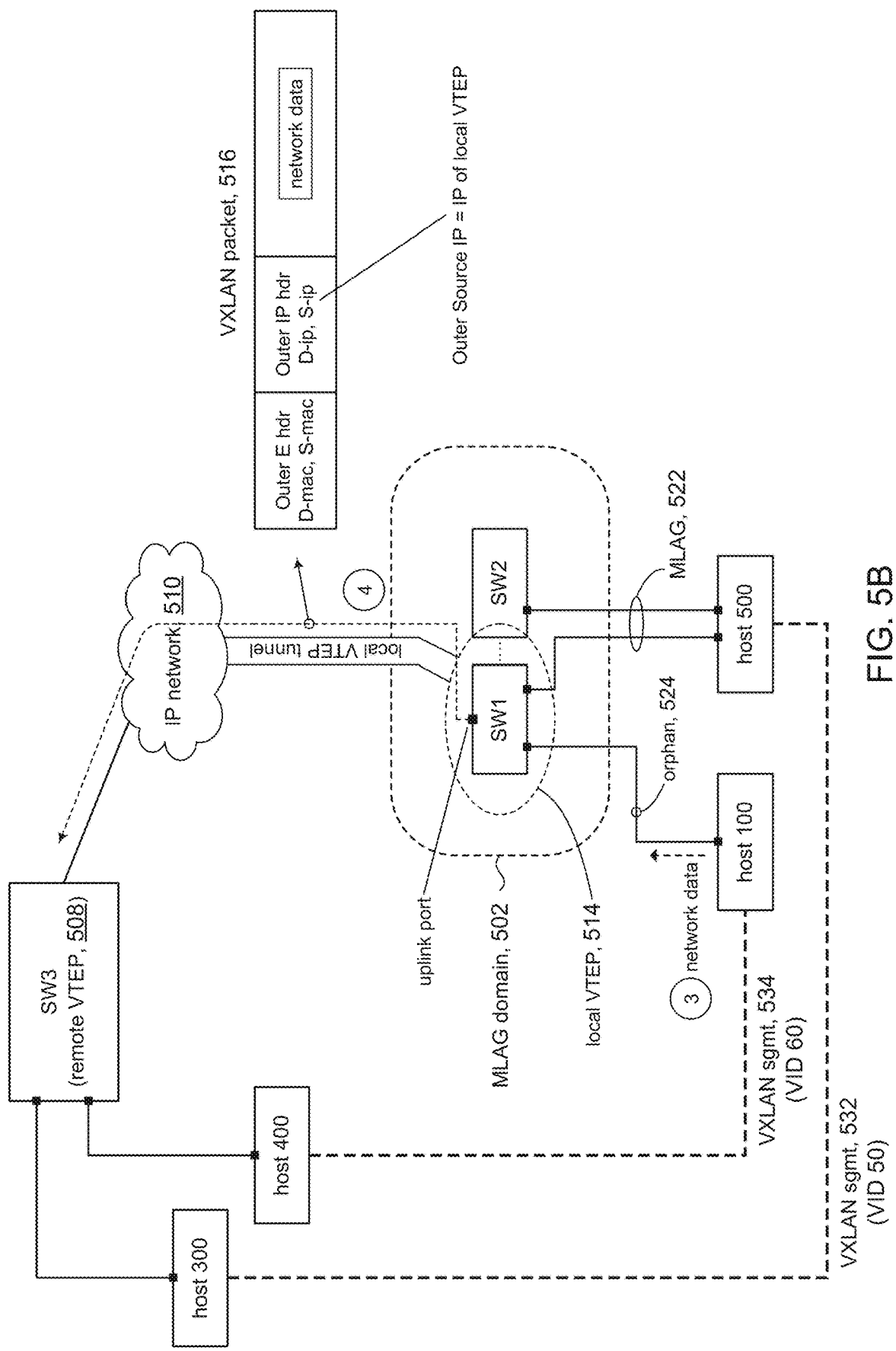

FIGS. 5A and 5B show two illustrative use cases to explain VXLAN encapsulation in an MLAG domain in accordance with the present disclosure. FIG. 5A, shows that MLAG domain 502 is configured with MLAG VTEP 504, which is associated with switches SW1, SW2 in the MLAG domain. FIG. 5B shows further that MLAG domain 502 is also configured with local VTEP 514, which is associated with only switch SW1 in the MLAG domain. Hosts 500, 300 are connected by VXLAN segment 532 on a VLAN identified by VID 50, and hosts 100, 400 are connected by VXLAN segment 534 on a VLAN identified by VID 60.

Referring to FIG. 5A, consider first the use case, where host 500 sends network data on VID 50 to host 300. Host 500 is connected to MLAG domain 502 via a port in MLAG 522. Suppose host 500 sends network data to an MLAG port on switch SW1, as indicated by a circled '1' in FIG. 5A. In response, switch SW1 can function as an MLAG VTEP and encapsulate the network data to create outgoing (upstream) VXLAN packet 506. Switch SW1 can send the upstream VXLAN packet to remote VTEP 508 associated with switch SW3 over IP network 510 via the tunnel associated with MLAG VTEP 504 (see circled '2' in FIG. 5A). Referencing FIG. 3, upstream VXLAN packet 506 can include the following outer Ethernet header and outer IP header information:

destination MAC address—The destination MAC address corresponds to a port on the next hop device that the MLAG VTEP will send the VXLAN packet to. Referring to FIG. 5A, for example, the next hop device can be a router (not shown) at the edge of IP network 510, and so the destination MAC address can correspond to a port on that edge router.

source MAC address—The source MAC address refers to the MAC address of the Ethernet port associated with MLAG VTEP 504. The source MAC address can therefore correspond to an uplink port on switch SW1 or an uplink port on switch SW2, depending on which switch transmits the outgoing packet. The decision as to the switch can depend on factors such as the current I/O load in each switch, which switch the packet came in on, and so on. The use case in FIG. 5A, for example, shows that the outgoing packet is transmitted by switch SW1, and so the source MAC address will correspond to an uplink port on switch SW1.

destination IP address—The destination IP address is the IP address of remote VTEP 508 associated with switch SW3.

source IP address—The source IP (SIP) address refers to the IP address associated with MLAG VTEP 504.

When switch SW3 receives VXLAN packet 506 from the network (e.g., via VTEP 508), the switch can use information in the received VXLAN packet to update its forwarding tables to learn a mapping between VID 50 and MLAG VTEP 504. Referring for a moment to FIG. 3, VXLAN packet 506 contains the original L2 frame sent by host 500, which includes the VLAN ID, namely VID 50. VXLAN packet 506 also contains the outer IP header, which includes the outer source IP address of the source VTEP, in this case the source VTEP is MLAG VTEP 504. In this way, when host 300 on switch SW3 at a later time sends a packet on VID 50 to host 500, switch SW3 can map VID 50 to the IP address of MLAG VTEP 504, thus targeting MLAG VTEP 504 as the destination VTEP for the outgoing VXLAN packet.

Because MLAG VTEP 504 is associated with both switches SW1, SW2 in MLAG domain 502, a VXLAN packet that is received by the MLAG VTEP can be processed by either switch. The MLAG VTEP can select one of the switches based, for example, on each switch's capacity for handling the received packet, the available processing bandwidth in each switch, and other factors. Due to the dynamic and unpredictable nature of incoming and outgoing packet flow, the selection of SW1 or SW2 for processing an incoming packet received by MLAG VTEP 504 is typically a random process.

Referring now to the use case shown in FIG. 5B, where host 100 sends network data to host 400 on VID 60. The figure shows host 100 sending the network data to MLAG domain 502 (see circled '3' in FIG. 5B). However, unlike host 500, host 100 is connected to orphan port 524 on switch SW1. In accordance with the present disclosure, in response to switch SW1 receiving network data on its orphan port, the switch can function as local VTEP 514, which is associated only with switch SW1, instead of functioning as MLAG VTEP 504. Local VTEP 514 can encapsulate the network data to create (upstream) VXLAN packet 516 and transmit the VXLAN packet to remote VTEP 508 in switch SW3 over IP network 510 (see circled '4' in FIG. 5B). Upstream VXLAN packet 516 can include the following outer Ethernet header information and outer IP header information (reference FIG. 3):

destination MAC address—The destination MAC address corresponds to a port on the next hop device that local VTEP 514 will send the VXLAN packet to. As explained in connection with FIG. 5A, the next hop device can be a router (not shown) at the edge of IP network 510, and so the destination MAC address can correspond to a port on that edge router.

source MAC address—The source MAC address refers to the MAC address of local VTEP 514, which is associated only with switch SW1. Accordingly, the source MAC address corresponds to an uplink port on switch SW1.

destination IP address—The destination IP address is the IP address of remote VTEP 508 associated with switch SW3.

source IP address—The source IP (SIP) address refers to the IP address of local VTEP 514, the functionality of which is provided only by switch SW1 and so the SIP is the IP address associated with local VTEP 514.

Consider the mapping in switch SW3 for this use case. When switch SW3 receives VXLAN packet 516 from the network, the switch can use information in the received VXLAN packet to update its forwarding tables to include a mapping between VID 60 and local VTEP 504. Referring again to FIG. 3, VXLAN packet 516 contains the original L2 frame sent by host 100, which includes the VLAN ID, namely VID 60. VXLAN packet 516 contains the outer IP header, which includes the outer source IP address of the source VTEP, in this case local VTEP 514. In this way, when host 400 on switch SW3 sends a packet on VID 60 to host 100, switch SW3 can map VID 60 to the IP address of local VTEP 514 to target the local VTEP as the destination VTEP for an outgoing VXLAN packet. Since the local VTEP 514 is associated only with switch SW1, any VXLAN packet that is sent to local VTEP 514 will be processed only by switch SW1.

Still referring to FIG. 5B, consider now the use case where MLAG domain 502 is configured with only MLAG VTEP 504. Data sent from host 100 to host 400 on VID 60 would create a mapping in switch SW3 that maps VID 60 to MLAG VTEP 504. When host 400 later on sends data to host 100 on VID 60, switch SW3 would send the data to MLAG VTEP 504. As explained, MLAG VTEP 504, being associated with both switches SW1, SW2, will randomly select one of the two switches to handle the data received from SW3 that is destined for host 100. Thus, about half the time data destined for host 100 would be processed by switch SW1 and about half the time data destined for host 100 would be processed by switch SW2. If switch SW1 receives the data, then SW1 can forward the data directly to host 100 because host 100 is connected to switch SW1. On the other hand, if switch SW2 receives the data, then SW2 must first forward the data to SW1 before the data can be sent to host 100 by switch SW1.

It can be seen that in an MLAG domain that is configured with only an MLAG VTEP and no local VTEP, on average, some percentage of the time (e.g., 50%) data will be forwarded to the switch that is not connected to the target host, the data will be misdirected. This misdirection of data requires an additional step of forwarding the data to the switch that is connected to the target host. The transferring of data from one switch to another can degrade packet forwarding performance because some percentage of the time (perhaps 50% of the time) is spent simply sending the misdirected data across the peer link to the correct switch in order to reach the target host. The misdirected data will have to traverse the peer link to get to its destination. This is wasteful of data bandwidth and processor bandwidth.

The peer link is typically not designed to handle unicast traffic; it is not deemed part of the switching fabric. Therefore, misdirected data crossing the peer link can incur overhead and can overwhelm the link, thus degrading performance of the MLAG domain. Additionally, if the peer link goes down, misdirected data will have no path the target host.

By comparison, configuring the MLAG domain with a local VTEP in accordance with embodiments of the present disclosure, such as illustrated in FIG. 5B, can avoid data misdirection and its negative effects because data will be sent to the local VTEP and hence to the correct switch, thus improving performance in the MLAG domain.

Figure 6:
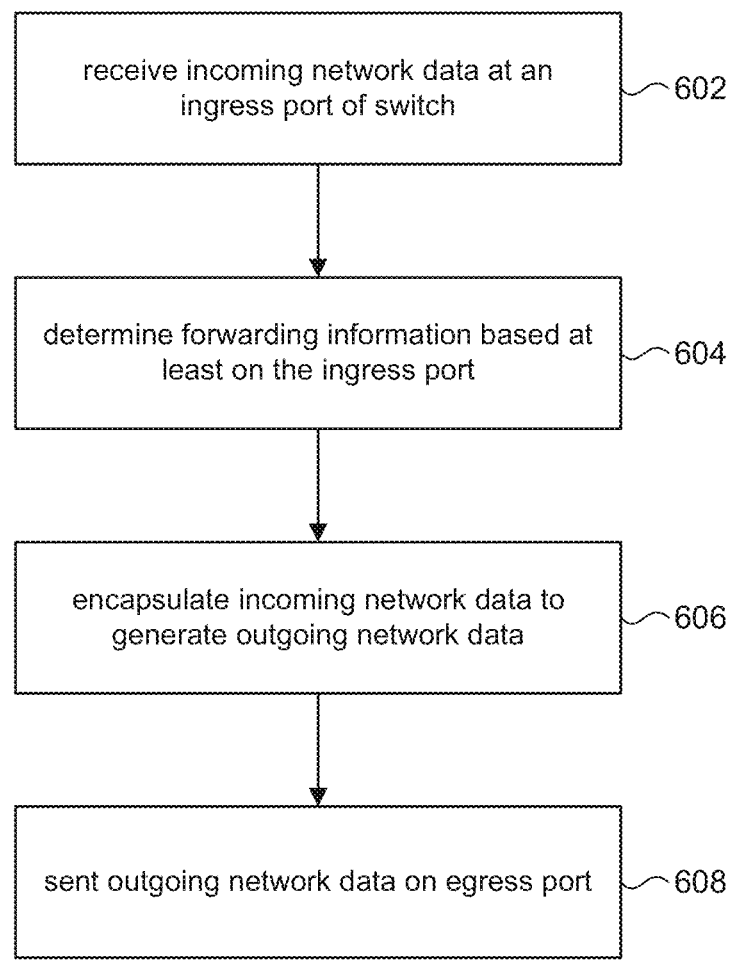
FIG. 6 is a high-level description of port-based mapping in accordance with some embodiments.

Referring to FIG. 6, the discussion will now turn to a high level description of processing in a switching device to generate outgoing network data in accordance with the present disclosure. In some embodiments, for example, the switching device can include computer executable program code, which when executed by a processor (e.g., 1002, FIG. 10), can cause the processor to perform the processing in accordance with FIG. 6. The flow of operations performed by the processor is not necessarily limited to the order of operations shown. The operations will be described, without loss of generality, in the context of a specific example. More particularly, the operations will be explained using the VXLAN example shown in FIGS. 5A and 5B, where the operations can be performed by switch SW1 in MLAG domain 502.

At operation 602, the switching device can receive incoming network data from a host. Referring to FIG. 5A, for example, switch SW1 may receive network data from host 100 or host 500. In some embodiments, the network data arriving at switch SW1 can be an Ethernet frame.

At operation 604, the switching device can determine forwarding information that is used to encapsulate the original L2 frame to create outgoing network data using one or more port-based mapping tables (e.g., 114, FIG. 1). For the VXLAN example depicted in FIGS. 5A and 5B, the outgoing network data is a VXLAN packet. Accordingly, the forwarding information can include the information shown in FIG. 3 for a VXLAN packet. The network data received at operation 602 constitutes Original L2 Frame 312, and the forwarding information comprises the remaining information depicted in FIG. 3. In accordance with the present disclosure, some of the forwarding information can be determined based at least on the port (ingress port) that the incoming network data was received on. With respect to the use cases described in FIGS. 5A and 5B, for instance, port-based forwarding information can include the Outer Source IP address component of the VXLAN packet. As explained with reference to FIG. 5A, for example, when the network data is received on an MLAG port, the Outer Source IP address can be the IP address of the MLAG VTEP 504. Referring to FIG. 5B, on the other hand, when the network data is received on an orphan port, the Outer Source IP address can be the IP address of the local VTEP 514. In some embodiments, for instance, information associated with the ingress port (e.g., MAC address) can be used to index one or more port-based mapping tables to determine the Outer Source IP address. It will be appreciated that in other embodiments of the present disclosure, one or more other components of the VXLAN packet shown in FIG. 3 can be determined based on the ingress port on which the network data was received.

At operation 606, the switching device can encapsulate the network data received at operation 602 to generate outgoing network data, using the port-based forwarding information determined at operation 604. For the VXLAN example depicted in FIGS. 5A and 5B, for example, the outgoing network data is a VXLAN packet such as shown in FIG. 3.

At operation 608, the switching device can send the outgoing network data on an egress port. The egress port can be determined based on the destination host; e.g., using the MAC address and IP address associated with the destination of the network data. In some embodiments in accordance with the present disclosure, the egress port can be determined based on the ingress port, in conjunction with or instead of the destination host.

Figure 7:
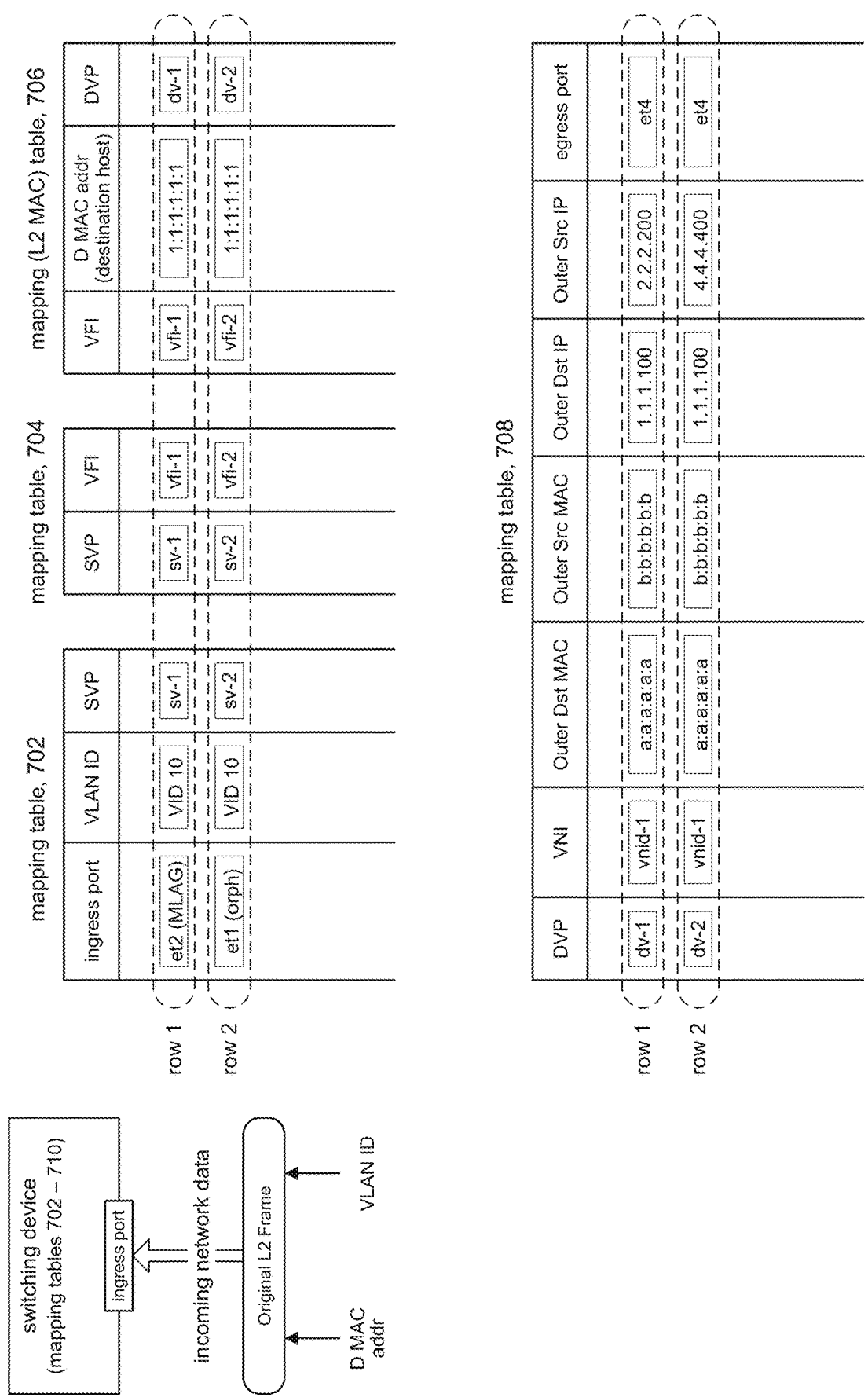
FIG. 7 shows an illustrative example of mapping tables in accordance with some embodiments.
Figure 8A:
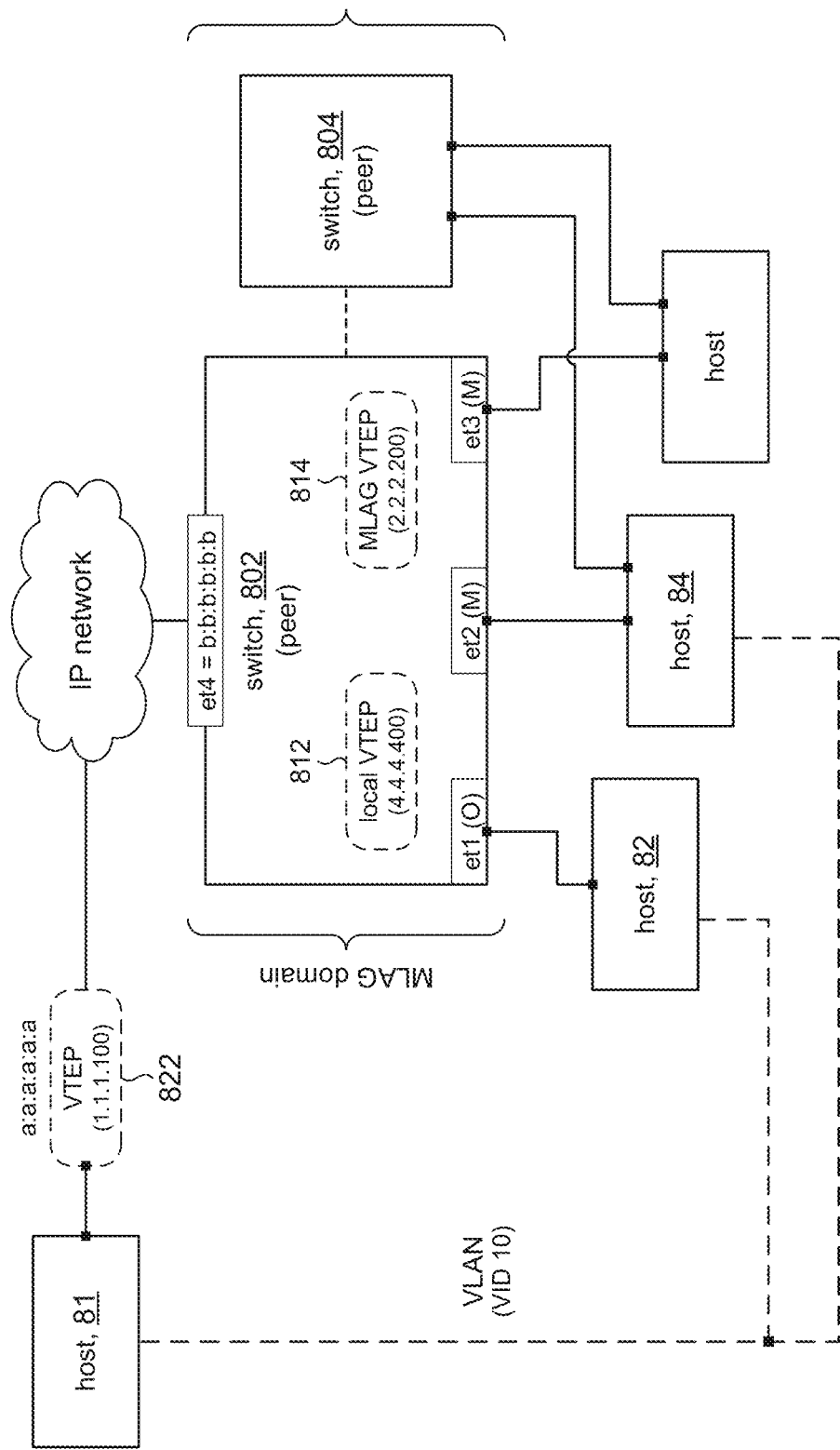
FIGS. 8A-8B show network configurations to illustrate aspects of mapping tables in accordance with the present disclosure.

Referring to FIGS. 7 and 8A, the discussion will now to turn to a description of mapping tables 702-708 that can be used in a switching device (e.g., 112, FIG. 1) to generate outgoing network data in accordance with the present disclosure. The mapping tables shown in FIG. 7 are merely illustrative. It will be understood that specific details of the mapping tables, such as number of tables, mapping information details, how the mapping information is stored in the tables, and so on will vary from one embodiment to another. To facilitate the description of the mapping tables, we will suppose the switching device is on a VLAN with a VXLAN overlay, where incoming network data from a host (e.g., host 10, FIG. 1) is received on an ingress port of the switching device. Specific values shown in the mapping tables in FIG. 7 correspond to the illustrative configuration shown in FIG. 8A.

Mapping table 702 provides a source virtual port (SVP) that is assigned to the incoming network data. In accordance with the present disclosure, the SVP for incoming network data can be determined based on the ingress port of the switch on with the data was received. The SVP can be further based on the VLAN on which the incoming network data is sent; for example, the VLAN identifier can be the 802.1Q tag contained in the L2 frame that constitutes the incoming network data. In accordance with some embodiments of the present disclosure, where the switching device is a peer switch in an MLAG domain, a distinction can be made between MLAG ports and orphan ports of the switching device. Thus, data received on an MLAG port on a given VLAN can be assigned to an SVP that is different from the SVP assigned to data received on the same VLAN but on an orphan port. Mapping table 702 illustrates this distinction, where data received on MLAG port et1 for VLAN VID 100 are assigned to a first SVP sv-1, while data received on orphan port et10 for the same VLAN VID 100 are assigned to a second SVP sv-2 different from sv-1.

Mapping table 704 provides a virtual forwarding instance (VFI), which is a broadcast domain identifier associated with a VXLAN network identifier (VNI). In some embodiments, for example, the VFI can be based on the SVP obtained from mapping table 702.

Mapping table 706 provides a destination virtual port (DVP) based on (1) the VFI provided using mapping table 704 and (2) the destination MAC address contained in the incoming network data. In some embodiments, mapping table 706 corresponds to an L2 MAC table that is adapted for VLXAN overlays and outputs a DVP that is associated with an egress port rather than a MAC address of the egress port.

Mapping table 708 can provide forwarding information used to send the incoming network data to the next hop in the VXLAN. In a VXLAN, for example, the forwarding information comprises information used to encapsulate the incoming network data in a VXLAN packet (see FIG. 3). The VNI field in mapping table 708 is a VXLAN identifier of the VXLAN segment that overlays the VLAN, and is placed in the VLXAN Header component of the VXLAN packet. The Outer Dst MAC and Src MAC fields in mapping table 708 constitute the Outer Ethernet Header portion of the VXLAN packet. The Outer Dst IP and Src IP fields in mapping table 708 constitute the Outer IP Header portion of the VXLAN packet. The egress port field in mapping table 708 is a MAC address of the egress port of the switch on which the resulting VXLAN packet can be sent as outgoing network data.

In accordance with some embodiments of the present disclosure, the mapping tables include a first set of forwarding information used to forward incoming network data that is received on an MLAG port to the next hop device in the VXLAN. The mapping tables include a second set of forwarding information used to forward incoming network data to the same next hop device, but for data received on an orphan port. This aspect of the mapping tables in accordance with the present disclosure is illustrated using the configuration shown in FIG. 8A.

FIG. 8A shows an example of an MLAG domain in a VXLAN. The MLAG domain comprises peer switches 802, 804. The peer switches are connected to the VLANs identified by VID 10, VID 20, which are defined on a VXLAN overlay. Switch 802 includes MLAG ports (et2, et3) and an orphan port (et1).

Consider the configuration of VLAN VID 10, where hosts 82, 84 communicate with host 81 on VID 10. Host 82 is connected to orphan port et1 on switch 802. Host 84 is connected to an MLAG port (et2) on switch 802. Both hosts can communicate with host 81 on VID 10 via VTEP 822, which is the next hop device relative to switch 802. Mapping tables 702-708 in FIG. 7 include forwarding information (row 1) for incoming data received on MLAG port et2 from host 84 and forwarding information (row 2) for incoming data received on orphan port et1 from host 82. For example, when network data destined for host 81 on VID 10 is received on MLAG port et2 (from host 84), the forwarding information is obtained from row 1 of the mapping tables to encapsulate the network data as follows:

Outer Dst MAC—a:a:a:a:a:a (MAC address of VTEP 822)
  Outer Src MAC—b:b:b:b:b:b (MAC address of egress port on switch 802)
  Outer Dst IP—1.1.1.100 (IP address of VTEP 822)
  Outer Src IP—2.2.2.200 (IP address of MLAG VTEP 814)

The Outer Src IP address is the IP address of MLAG VTEP 814 so that when host 81 sends data back to host 84, VTEP 822 at host 81 will target the data to MLAG VTEP 814.

By comparison, when the network data is received on orphan port et1 (from host 82), the mapping tables provide the forwarding information form row 2 for encapsulation:

Outer Dst MAC—a:a:a:a:a:a (MAC address of VTEP 822)
  Outer Src MAC—b:b:b:b:b:b (MAC address of egress port on switch 802)
  Outer Dst IP—1.1.1.100 (IP address of VTEP 822)
  Outer Src IP—4.4.4.400 (IP address of local VTEP 812)

It can be seen that the forwarding information is the same except for the Outer Src IP address, which is now the IP address of local VTEP 812 instead of the MLAG VTEP. This will cause VTEP 822 at host 81 to target the local VTEP when sending data back to host 82.

Figure 8B:
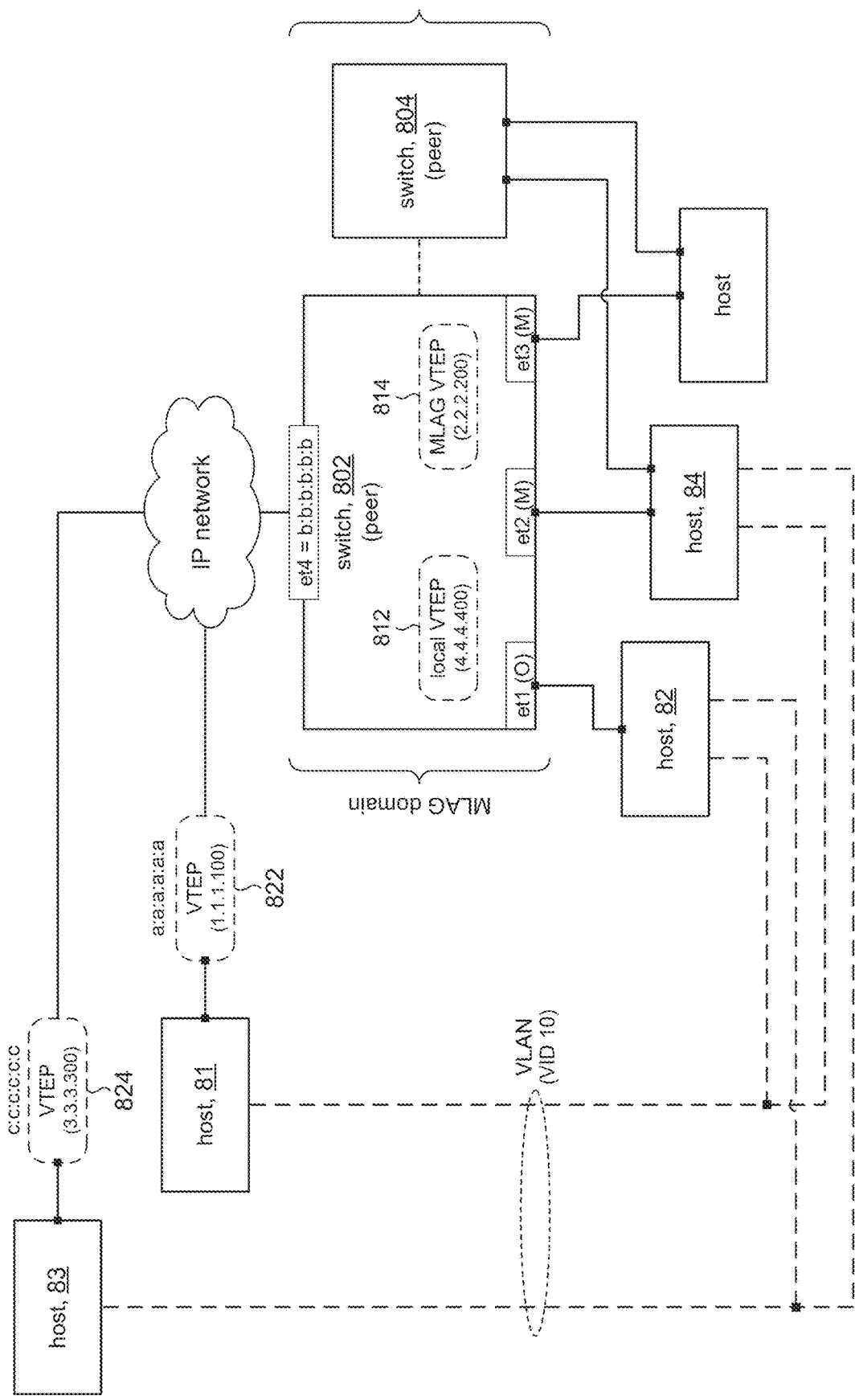
Figure 9:
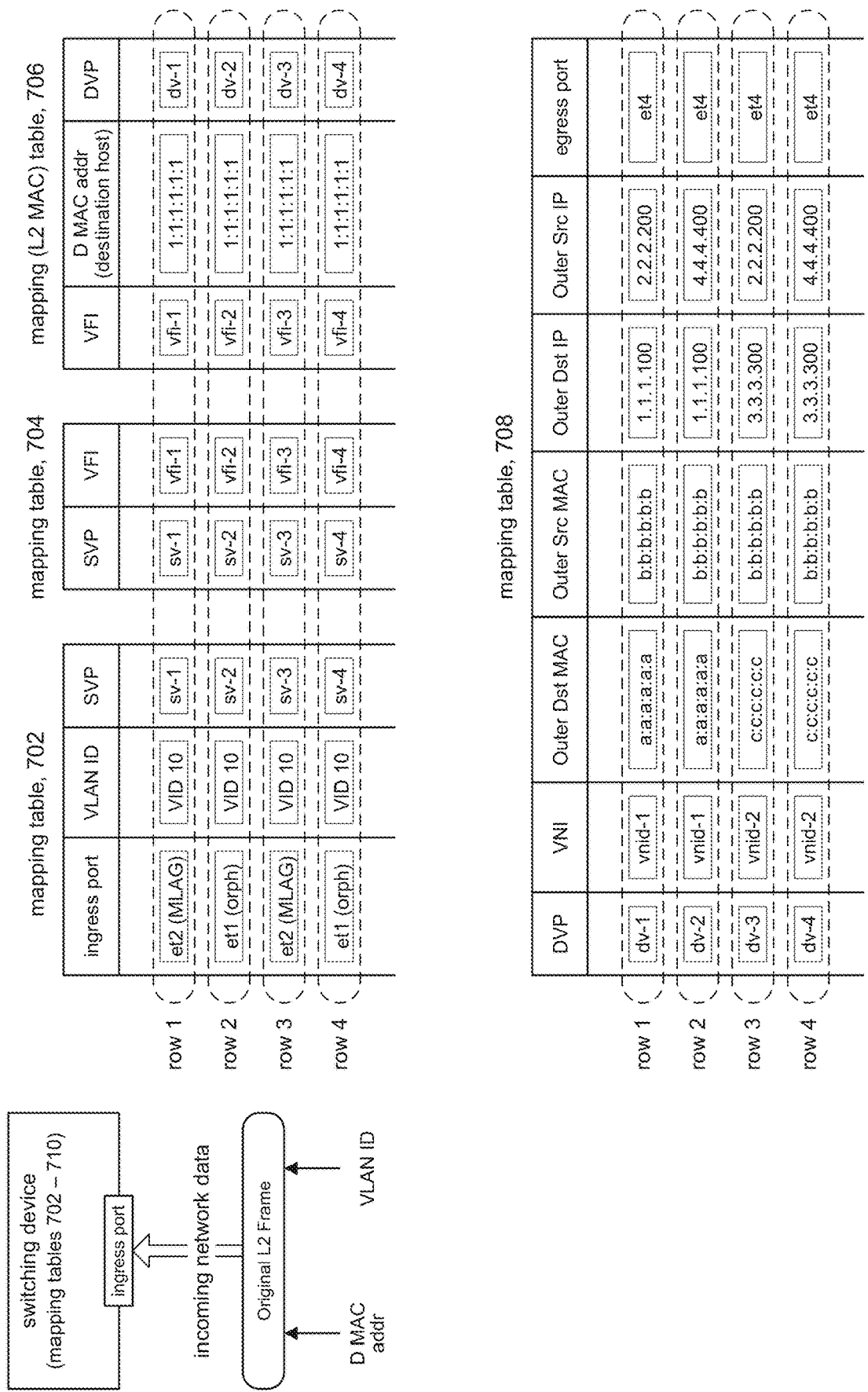
FIG. 9 illustrates updating the mapping tables in accordance with the present disclosure.

Referring to FIGS. 8B and 9, when a switch learns of a new next hop device (e.g., its MAC address) on a VLAN, the switch can update its mapping tables to include forwarding information used to forward incoming network data to the newly learned next hop device for data that is received on an MLAG port. In accordance with some embodiments of the present disclosure, the switch can further update its mapping tables to include forwarding information used to forward incoming network data to the same newly learned next hop device, but for data received on an orphan port.

FIG. 8B illustrates the addition of a host 83 on VLAN VID 10. For illustration purposes, host 83 is connected to VTEP 824, different from VTEP 822. VTEP 824 represents a new next hop device that can be learned by switch 802. When switch 802 learns the MAC address associated with VTEP 824, the mapping tables can be updated accordingly. FIG. 9 shows mapping tables 702-708 updated in accordance with the present disclosure in response to the addition of another next hop device on VID 10. For example, the mapping tables can be updated to include forwarding information (row 3) for forwarding incoming network data received on the MLAG port et2 to host 83. The mapping tables can be further updated to include forwarding information (row 4) to forward incoming network data to host 83 that is received on the orphan port et1.

Using the updated mapping tables shown in FIG. 9, when network data destined for host 83 on VID 10 is received on MLAG port et2 (from host 84), the mapping tables can provide the forwarding information from row 3 to encapsulate the network data as follows:

Outer Dst MAC—c:c:c:c:c:c (MAC address of VTEP 824)
  Outer Src MAC—b:b:b:b:b:b (MAC address of egress port on switch 802)
  Outer Dst IP—3.3.3.300 (IP address of VTEP 824)
  Outer Src IP—2.2.2.200 (IP address of MLAG VTEP 814)

The Outer Src IP address is the IP address of MLAG VTEP 814 so that when host 83 sends data back to host 84, VTEP 824 at host 83 will target the data to MLAG VTEP 814.

By comparison, when the network data is received on orphan port et1 (from host 82), the mapping tables can provide the forwarding information from row 4 to encapsulate the network data as follows:

Outer Dst MAC—c:c:c:c:c:c (MAC address of VTEP 824)
  Outer Src MAC—b:b:b:b:b:b (MAC address of egress port on switch 802)

Outer Dst IP—3.3.3.300 (IP address of VTEP 824)
Outer Src IP—4.4.4.400 (IP address of local VTEP 812)
The forwarding information is the same except for the Outer Src IP address, which is now the IP address of local VTEP 812 instead of the MLAG VTEP. This will cause VTEP 824 at host 83 to target the local VTEP when sending data back to host 82.

Figure 10:
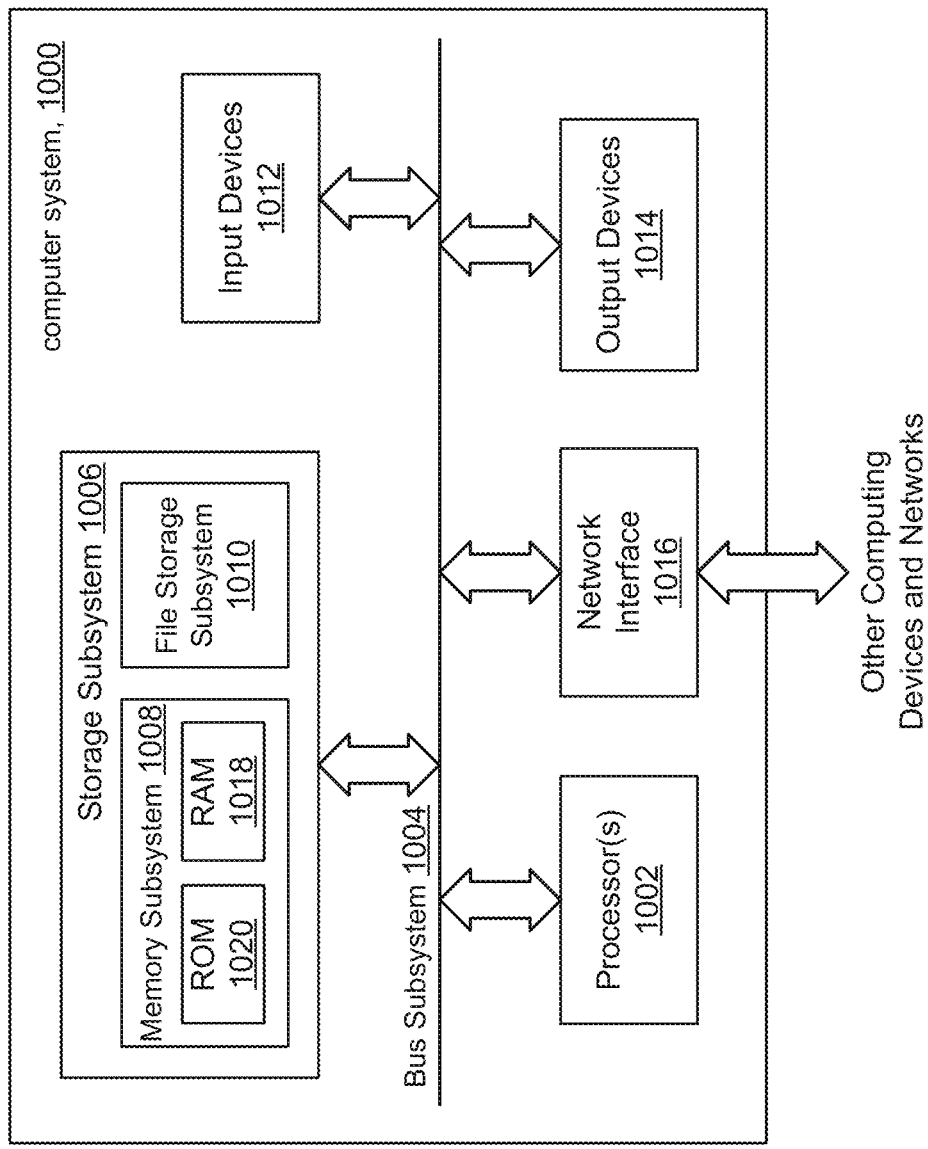
FIG. 10 is an illustrative computer system that can be embodied in accordance with the present disclosure.

FIG. 10 depicts a simplified block diagram of an example computer system 1000 according to certain embodiments. Computer system 1000 can be used to implement a switching device in accordance with the present disclosure. As shown in FIG. 10, computer system 1000 includes one or more processors 1002 that communicate with a number of peripheral devices via bus subsystem 1004. These peripheral devices include storage subsystem 1006 (comprising memory subsystem 1008 and file storage subsystem 1010), user interface input devices 1012, user interface output devices 1014, and network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Memory subsystem 1006 includes memory subsystem 1008 and file/disk storage subsystem 1010 represent non-transitory computer-readable storage media that can store program code and/or data, which when executed by processor 1002, can cause processor 1002 to perform operations in accordance with embodiments of the present disclosure.

Memory subsystem 1008 includes a number of memories including main random access memory (RAM) 1018 for storage of instructions and data during program execution and read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Further Illustrative Embodiments

In accordance with the present disclosure, some embodiments include a method in a switching device includes receiving incoming network data on an ingress port of the switching device and generating outgoing network data for transmission to a next hop. Generating the outgoing network data can include obtaining forwarding information from one or more mapping tables using information contained in the incoming network data as one or more index keys into the one or more mapping tables, wherein the forwarding information includes a source address associated with the switching device that is determined based on whether or not the ingress port is a first kind of port or a second kind of port; and combining the incoming network data with the forwarding information to generate the outgoing network data. The method further includes sending the outgoing network data to the next hop on an egress port of the switching device.

In some embodiments of the method, the first type of port is a multi-chassis link aggregation group (MLAG) port on the switching device and the second kind of port is an orphan port on the switching device.

In some embodiments of the method, for each next hop that the switching device can transmit data to, the one or more mapping tables include first forwarding information used to forward incoming network data that is received on the first kind of port to said each next hop and second forwarding information used to forward incoming network data that is received on the second kind of port to said each next hop.

In some embodiments, the method further comprises learning of a new next hop device. In response to the learning of a new next hop device, the method includes storing first forwarding information in the one or more mapping tables to forward incoming network data received on the first kind of port to the new next hop device; and storing second forwarding information in the one or more mapping tables to forward incoming network data received on the second kind of port to the new next hop device.

In some embodiments of the method, the switching device operates as a first VXLAN endpoint (VTEP) device and the source address associated with the switching device is an address of the first VTEP device when the ingress port on the switching device is a member of an MLAG, wherein the switching device operates as a second VTEP device and the source address associated with the switching device is an address of the second VTEP device when the ingress port on the switching device is an orphan port. In some embodiments, the next hop is an uplink VTEP device.

In some embodiments of the method, the switching device is configured in a VXLAN, and the outgoing network data is a VXLAN packet, wherein the source address associated with the switching device and the destination address associated with the next hop are, respectively, an outer source Internet Protocol (IP) address and an outer destination IP address in the VXLAN packet.

In some embodiments, the method further comprises encapsulating the incoming network data with a media access control (MAC) address of the ingress port of the switching device as a source MAC address in the outgoing network data and a MAC address of the next hop as a destination MAC address in the outgoing network data.

In accordance with the present disclosure, some embodiments include a non-transitory computer-readable storage medium has stored thereon computer executable instructions, which when executed by a computer device, cause the computer device to receive incoming network data on an ingress port of the switching device and generate outgoing network data for transmission to a next hop. The outgoing network data can be generated by obtaining forwarding information from one or more mapping tables using information contained in the incoming network data as one or more index keys into the one or more mapping tables, wherein the forwarding information includes a source address associated with the switching device that is determined based on whether or not the ingress port is a first kind of port or a second kind of port; and combining the incoming network data with the forwarding information to generate the outgoing network data. The computer executable instructions, which when executed by a computer device, further cause the computer device to send the outgoing network data to the next hop on an egress port of the switching device.

In some embodiments of the non-transitory computer-readable storage medium, the first type of port is a multi-chassis link aggregation group (MLAG) port on the switching device and the second kind of port is an orphan port on the switching device.

In some embodiments of the non-transitory computer-readable storage medium, for each next hop that the switching device can transmit data to, the one or more mapping tables include first forwarding information used to forward incoming network data that is received on the first kind of port to said each next hop and second forwarding information used to forward incoming network data that is received on the second kind of port to said each next hop.

In some embodiments of the non-transitory computer-readable storage medium, the computer executable instructions, which when executed by the computer device, further cause the computer device to learn of a new next hop device, and in response store first forwarding information in the one or more mapping tables to forward incoming network data received on the first kind of port to the new next hop device; and store second forwarding information in the one or more mapping tables to forward incoming network data received on the second kind of port to the new next hop device.

In some embodiments of the non-transitory computer-readable storage medium, the switching device operates as a first VXLAN endpoint (VTEP) device and the source address associated with the switching device is an address of the first VTEP device when the ingress port on the switching device is a member of an MLAG, wherein the switching device operates as a second VTEP device and the source address associated with the switching device is an address of the second VTEP device when the ingress port on the switching device is an orphan port. In some embodiments, the next hop is an uplink VTEP device.

In accordance with the present disclosure, some embodiments include a switching device comprises one or more computer processors; and a computer-readable storage medium. The computer-readable storage medium comprises instructions for controlling the one or more computer processors to be operable to receive incoming network data on an ingress port of the switching device; and generate outgoing network data for transmission to a next hop. Generating the outgoing network data includes obtaining forwarding information from one or more mapping tables using information contained in the incoming network data as one or more index keys into the one or more mapping tables, wherein the forwarding information includes a source address associated with the switching device that is determined based on whether or not the ingress port is a first kind of port or a second kind of port; and combining the incoming network data with the forwarding information to generate the outgoing network data. The computer-readable storage medium comprises instructions for controlling the one or more computer processors to be operable to send the outgoing network data to the next hop on an egress port of the switching device.

In some embodiments of the switching device, the first type of port is a multi-chassis link aggregation group (MLAG) port on the switching device and the second kind of port is an orphan port on the switching device.

In some embodiments of the switching device, for each next hop that the switching device can transmit data to, the one or more mapping tables include first forwarding information used to forward incoming network data that is received on the first kind of port to said each next hop and second forwarding information used to forward incoming network data that is received on the second kind of port to said each next hop.

In some embodiments of the switching device, the computer-readable storage medium further comprises instructions for controlling the one or more computer processors to be operable to learn of a new next hop device, and in response store first forwarding information in the one or more mapping tables to forward incoming network data received on the first kind of port to the new next hop device; and store second forwarding information in the one or more mapping tables to forward incoming network data received on the second kind of port to the new next hop device.

In some embodiments, the switching device operates as a first VXLAN endpoint (VTEP) device and the source address associated with the switching device is an address of the first VTEP device when the ingress port on the switching device is a member of an MLAG, wherein the switching device operates as a second VTEP device and the source address associated with the switching device is an address of the second VTEP device when the ingress port on the switching device is an orphan port. In some embodiments, the next hop is an uplink VTEP device.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a switching device, the method comprising:
receiving incoming network data on an ingress port of the switching device, wherein the incoming network data specifies a virtual local area network identifier (VLAN ID);
generating outgoing network data for transmission to a next hop, including:
obtaining forwarding information from one or more mapping tables using the VLAN ID contained in the incoming network data and the ingress port as index keys into the one or more mapping tables to identify the forwarding information, wherein the ingress port and the VLAN ID map to first forwarding information that includes a first source address associated with the switching device when the ingress port is a first kind of port, wherein the ingress port and the VLAN ID map to second forwarding information that includes a second source address associated with the switching device when the ingress port is a second kind of port; and
combining the incoming network data with the forwarding information to generate the outgoing network data; and
sending the outgoing network data to the next hop on an egress port of the switching device.

2. The method of claim 1, wherein the first type kind of port is a multi-chassis link aggregation group (MLAG) port on the switching device and the second kind of port is an orphan port on the switching device.

3. The method of claim 1, wherein for each next hop that the switching device can transmit data to, the one or more mapping tables include the first forwarding information to forward incoming network data received on the first kind of port to said each next hop and the second forwarding information to forward incoming network data received on the second kind of port to said each next hop.

4. The method of claim 1, wherein the ingress port and the VLAN ID map to a first virtual forwarding interface (VFI) when the ingress port is the first kind of port, wherein the ingress port and the VLAN ID map to a second VFI when the ingress port is the second kind of port, wherein the first VFI maps to the first forwarding information, wherein the second VFI maps to the second forwarding information.

5. The method of claim 1, wherein the switching device operates as a first VXLAN endpoint (VTEP) device and the first source address associated with the switching device is an address of the first VTEP device when the ingress port on the switching device is a member of an MLAG, wherein the switching device operates as a second VTEP device and the second source address associated with the switching device is an address of the second VTEP device when the ingress port on the switching device is an orphan port.

6. The method of claim 5, wherein the next hop is an uplink VTEP device.

7. The method of claim 1, wherein the switching device is configured in a VXLAN, and the outgoing network data is a VXLAN packet, wherein the first and second source addresses associated with the switching device and the destination address associated with the next hop are, respectively, an outer source Internet Protocol (IP) address and an outer destination IP address in the VXLAN packet.

8. The method of claim 1, further comprising encapsulating the incoming network data with a media access control (MAC) address of the ingress port of the switching device as a source MAC address in the outgoing network data and a MAC address of the next hop as a destination MAC address in the outgoing network data.

9. A non-transitory computer-readable storage medium having stored thereon computer executable instructions, which when executed by a computer device in a switching device, cause the computer device to:
receive incoming network data on an ingress port of the switching device, wherein the incoming network data specifies a virtual local area network identifier (VLAN ID);
generate outgoing network data for transmission to a next hop, including:
obtaining forwarding information from one or more mapping tables using the VLAN ID contained in the incoming network data and the ingress port as index keys into the one or more mapping tables to identify the forwarding information, wherein the ingress port and the VLAN ID map to first forwarding information that includes a first source address associated with the switching device when the ingress port is a first kind of port, wherein the ingress port and the VLAN ID map to second forwarding information that includes a second source address associated when the ingress port is second kind of port; information, where the ingress port and the VLAN ID map to first forwarding and
combining the incoming network data with the forwarding information to generate the outgoing network data; and
send the outgoing network data to the next hop on an egress port of the switching device.

10. The non-transitory computer-readable storage medium of claim 9, wherein the first kind of port is a multi-chassis link aggregation group (MLAG) port on the switching device and the second kind of port is an orphan port on the switching device.

11. The non-transitory computer-readable storage medium of claim 9, wherein for each next hop that the switching device can transmit data to, the one or more mapping tables include the first forwarding information used to forward incoming network data that is received on the first kind of port to said each next hop and the second forwarding information used to forward incoming network data that is received on the second kind of port to said each next hop.

12. The non-transitory computer-readable storage medium of claim 9, wherein the ingress port and the VLAN ID map to a first virtual forwarding interface (VFI) when the ingress port is the first kind of port, wherein the ingress port and the VLAN ID map to a second VFI when the ingress port is the second kind of port, wherein the first VFI maps to the first forwarding information, wherein the second VFI maps the second forwarding information.

13. The non-transitory computer-readable storage medium of claim 9, wherein the switching device operates as a first VXLAN endpoint (VTEP) device and the first source address associated with the switching device is an address of the first VTEP device when the ingress port on the switching device is a member of an MLAG, wherein the switching device operates as a second VTEP device and the second source address associated with the switching device is an address of the second VTEP device when the ingress port on the switching device is an orphan port.

14. The non-transitory computer-readable storage medium of claim 9, wherein the next hop is an uplink VTEP device.

15. A switching device comprising:
one or more computer processors; and
a computer-readable storage medium comprising instructions for controlling the one or more computer processors to be operable to:
receive incoming network data on an ingress port of the switching device, wherein the incoming network data specifies a virtual local area network identifier (VLAD ID);
generate outgoing network data for transmission to a next hop, including:
obtaining forwarding information from one or more mapping tables using the VLAN ID contained in the incoming network data and the ingress port as index keys into the one or more mapping tables to identify the forwarding information, wherein the ingress port and the VLAN ID map to first forwarding information that includes a first source address associated with the switching device when the ingress port is a first kind of port, wherein the ingress port and the VLAN ID map to second forwarding information that includes a second source address associated when the ingress port is second kind of port; and combining the incoming network data with the forwarding information to generate the outgoing network data; and send the outgoing network data to the next hop on an egress port of the switching device.

16. The switching device of claim 15, wherein the first kind of port is a multi-chassis link aggregation group (MLAG) port on the switching device and the second kind of port is an orphan port on the switching device.

17. The switching device of claim 15, wherein for each next hop that the switching device can transmit data to, the one or more mapping tables include the first forwarding information used to forward incoming network data that is received on the first kind of port to said each next hop and the second forwarding information used to forward incoming network data that is received on the second kind of port to said each next hop.

18. The switching device of claim 15, wherein the ingress port and the VLAN ID map to a first virtual forwarding interface (VFI) when the ingress port is the first kind of port, wherein the ingress port and the VLAN ID map to a second VFI when the ingress port is the second kind of port, wherein the first VFI maps to the first forwarding information, wherein the second VFI maps to the second forwarding information.

19. The switching device of claim 15, wherein the switching device operates as a first VXLAN endpoint (VTEP) device and the first source address associated with the switching device is an address of the first VTEP device when the ingress port on the switching device is a member of an MLAG, wherein the switching device operates as a second VTEP device and the second source address associated with the switching device is an address of the second VTEP device when the ingress port on the switching device is an orphan port.

20. The switching device of claim 15, wherein the next hop is an uplink VTEP device.

* * * * *